United States Patent
Vollkommer et al.

(10) Patent No.: US 7,512,254 B2
(45) Date of Patent: Mar. 31, 2009

(54) SYSTEM AND METHOD FOR MOBILE BIOMETRIC AUTHENTICATION

(75) Inventors: Richard M. Vollkommer, Smithtown, NY (US); Bruce A. Willins, East Northport, NY (US); Brad Carlson, Northport, NY (US); Askold Strat, Sound Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 57 days.

(21) Appl. No.: 10/291,955

(22) Filed: Nov. 7, 2002

(65) Prior Publication Data

US 2003/0095689 A1    May 22, 2003

Related U.S. Application Data

(60) Provisional application No. 60/347,731, filed on Nov. 7, 2001.

(51) Int. Cl.
*G06K 9/00* (2006.01)
*G05B 19/00* (2006.01)

(52) U.S. Cl. .................................. 382/115; 340/5.83

(58) Field of Classification Search .............. 382/117, 382/118, 115–116; 340/5.83–5.82, 5.81, 340/5.8, 5.2, 5.1, 5.52, 5.53; 713/186; 234/454, 234/462.01, 462.09
See application file for complete search history.

(56) References Cited

U.S. PATENT DOCUMENTS

| | | | | |
|---|---|---|---|---|
| 6,070,141 | A * | 5/2000 | Houvener et al. | 705/1 |
| 6,394,356 | B1 * | 5/2002 | Zagami | 235/487 |
| 6,424,249 | B1 * | 7/2002 | Houvener | 340/5.82 |
| 6,542,624 | B1 * | 4/2003 | Oda | 382/117 |
| 6,560,741 | B1 * | 5/2003 | Gerety et al. | 714/752 |
| 2001/0034222 | A1 * | 10/2001 | Roustaei et al. | 455/403 |

* cited by examiner

*Primary Examiner*—Wenpeng Chen

(57) ABSTRACT

Described is a method and system for authenticating identity of a person using a portable device. The portable device may includes an imager, an image processing unit and a processor. The image processing unit reads encoded data in a first image from an imager of the device. The image processing unit extracts a portion of a second image from the imager to generate extracted portion data. The extracted portion of the second image corresponds to a portion of a person whose identity is to be authenticated. Stored biometric data for a person is located based on the data read from the first image. The processor compares the extracted portion data of the second image to the stored biometric data for a person.

22 Claims, 3 Drawing Sheets

SYSTEM AND METHOD FOR MOBILE BIOMETRIC AUTHENTICATION

PRIORITY CLAIM

This application claims the benefit of U.S. Provisional Patent Application Ser. No. 60/347,731 filed on Nov. 7, 2001 and entitled "Mobile Biometric Terminal" the entire disclosure of which is hereby expressly incorporated herein by reference.

BACKGROUND INFORMATION

User authentication is common to the vast majority of secure architectures. Knowledge based user authentication (password/PIN) is the most common authentication mechanism in use today. Such authentication is extremely weak and incurs high maintenance costs. Biometric authentication provides strong mechanisms that meet more stringent security requirements.

Biometric based authentication has been primarily relegated to fixed-mount systems or desktop/laptop platforms. With the advent of high-powered processing for mobile devices (e.g., PDA, hand-held scanner, etc.), it is now possible to perform biometric authentication on such mobile devices. In many cases the single largest issue is the availability of a sensor in these mobile device to read biometric information.

SUMMARY OF THE INVENTION

The present invention is directed to a method and system for authenticating identity of a person using a portable device. The portable device may includes an imager, an image processing unit and a processor. The image processing unit reads encoded data in a first image from an imager of the device. The image processing unit extracts a portion of a second image from the imager to generate extracted portion data. The extracted portion of the second image corresponds to a portion of a person whose identity is to be authenticated. Stored biometric data for a person is located based on the data read from the first image. The processor compares the extracted portion data of the second image to the stored biometric data for a person.

BRIEF DESCRIPTION OF DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

Figures 1, 4:
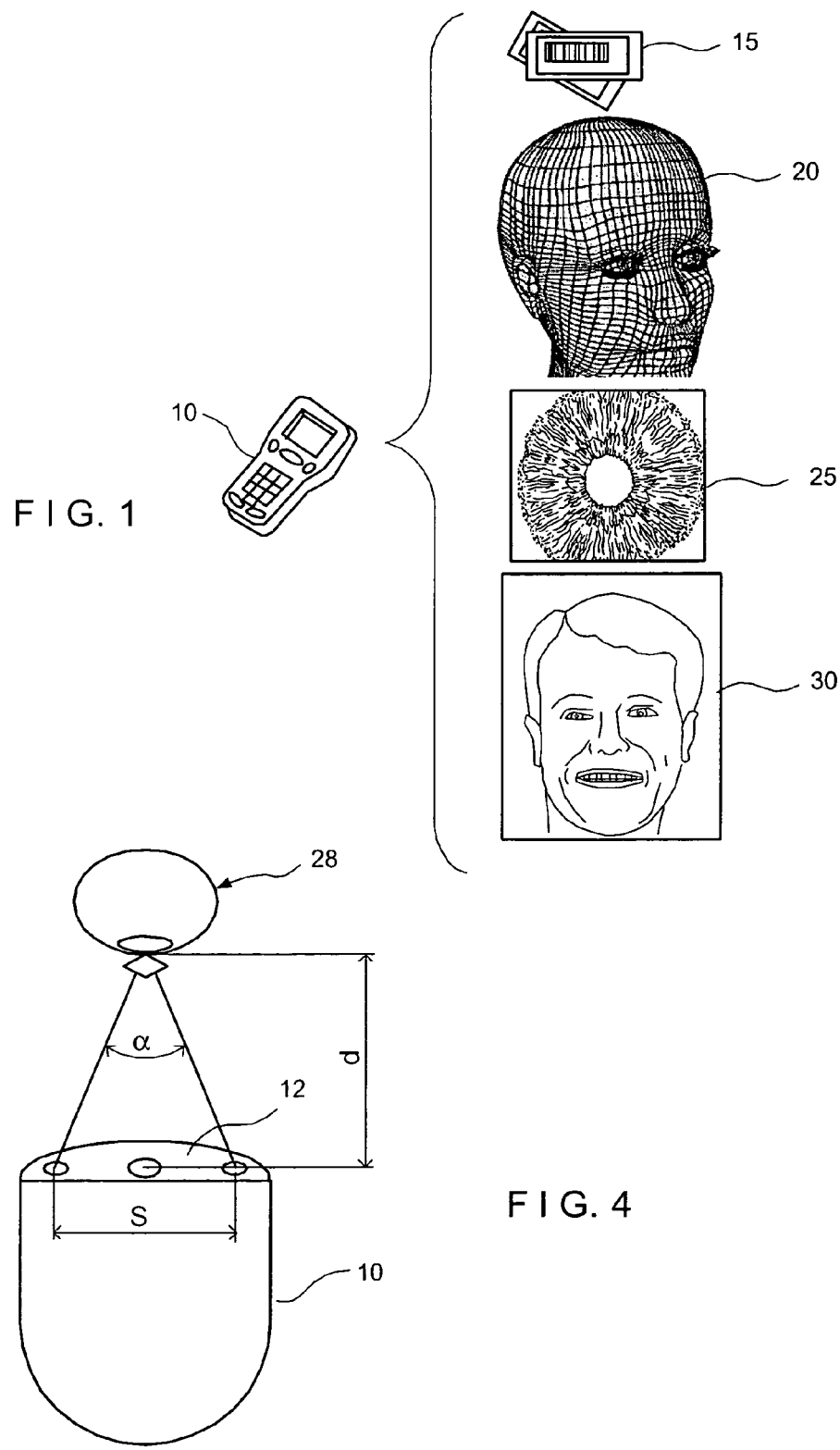
FIG. 1 shows an exemplary embodiment of a mobile device according to the present invention.
FIG. 4 shows an exemplary embodiment of a mobile device which is obtaining biometric data of a user.

The present invention may be further understood with reference to the following description of preferred exemplary embodiments and the related appended drawings, wherein like elements are provided with the same reference numerals.

It should be understood that, although the preferred embodiment of the present invention will be described with reference to a handheld bar code scanner, the present invention may be implemented on a wide range of mobile devices including, for example, Personal Digital Assistants (PDAs), cellular telephones, etc., and the term "mobile device" will be used throughout this description to generically refer to all such devices.

Figure 2:
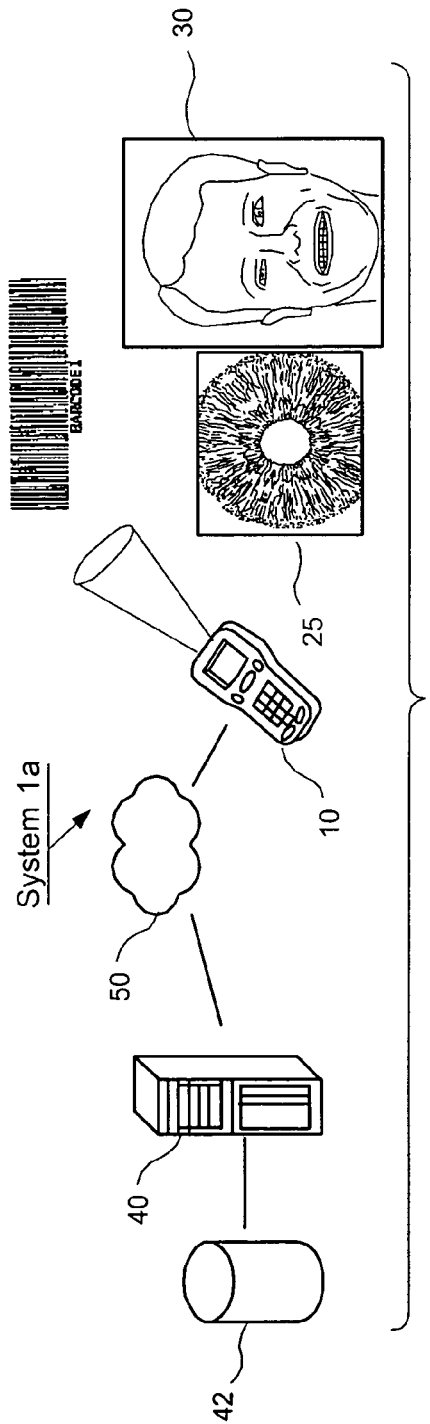
FIG. 2 shows an exemplary embodiment of a system according to the present invention.
Figure 3:
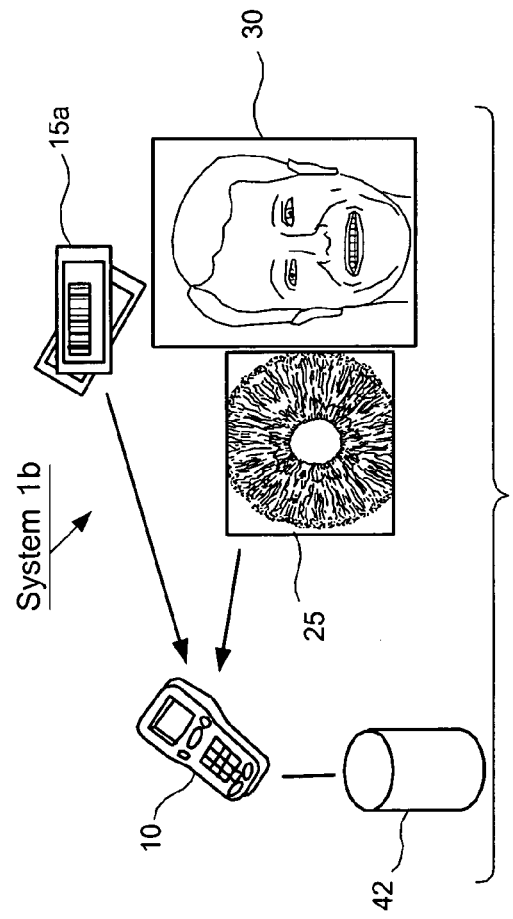
FIG. 3 shows another exemplary embodiment of a system according to the present invention.

FIG. 1 shows an exemplary embodiment of a mobile device 10 which may, for example, be a PDA, a hand-held imager, etc. The mobile device 10 includes an imager 12 for obtaining data from a surface, e.g., a bar code 15 and/or biometric data. The imager 12 may, for example, include a digital camera. The bar code 15 may, e.g, be a one-dimensional bar code 15a or a two-dimensional bar code 15b (e.g., PDF 417) as shown in FIGS. 2 and 3. Furthermore, the imager 12 obtains certain biometric data (e.g., a facial recognition data 20, an iris data 25, an image data 30, etc.) from a subject to be authenticated—e.g., to verify the identity of a person requesting access to a restricted area or device.

As described above, the mobile device 10 may be used for authentication purposes. For example, the system 1a of FIG. 2 may be used to authenticate the identity of the person of an identification card including bar code data 15. As shown in FIG. 2, the system 1a includes the mobile device 10 in communication with a server 40 via a communications network 50, where the server 40 may be a conventional computing arrangement including and/or connected to a database 42 including records for a plurality of people including the authorized person of the identification card. The record would include biometric and other data regarding the authorized person to aid in authentication. The communication network 50 may a wired network, a wireless network or a combination of both networks.

When the identification card is presented to the mobile device 10, the imager 12 first images the bar code data 15 and accesses the corresponding person record from the database 42. The mobile device 10 is then aimed at a selected biometric feature of the person presenting the identification card and this feature is imaged. The imaged biometric is compared to the stored data by a processor which may be included in either the mobile device 10 or the server 40 and, based on the comparison, a determination is made as to whether the person presenting the identification card is the authorized person.

One biometric feature which may be scanned for identification purposes is the iris of the presenter's eye. In this case, the imager 12 will include two separate light sources—a first visible light source for imaging the bar code data 15 and a near infrared light source for imaging the iris. As described in more detail below, this reduces reactions of the eye to the light making the reading of the biometric data more accurate and avoids irritating the subject's eye.

FIG. 3 shows another exemplary system 1b according to the present invention. The system 1b includes a mobile device 10 including an imager 12 which is capable of reading a two-dimensional bar code. Furthermore, the mobile device 10 of the system 1b stores a database 45 storing records for a plurality of people. As the two-dimensional bar codes to be read by the mobile device 10 of the system 1b, may store the biometric data for the authorized user as well as other identification data, the mobile device 10 need not be connected to a server 40. However, by connecting such a mobile device 10 to a remote server 40, the system might be able to handle both identifications including one-dimensional and two-dimensional bar code data.

Figure 5:
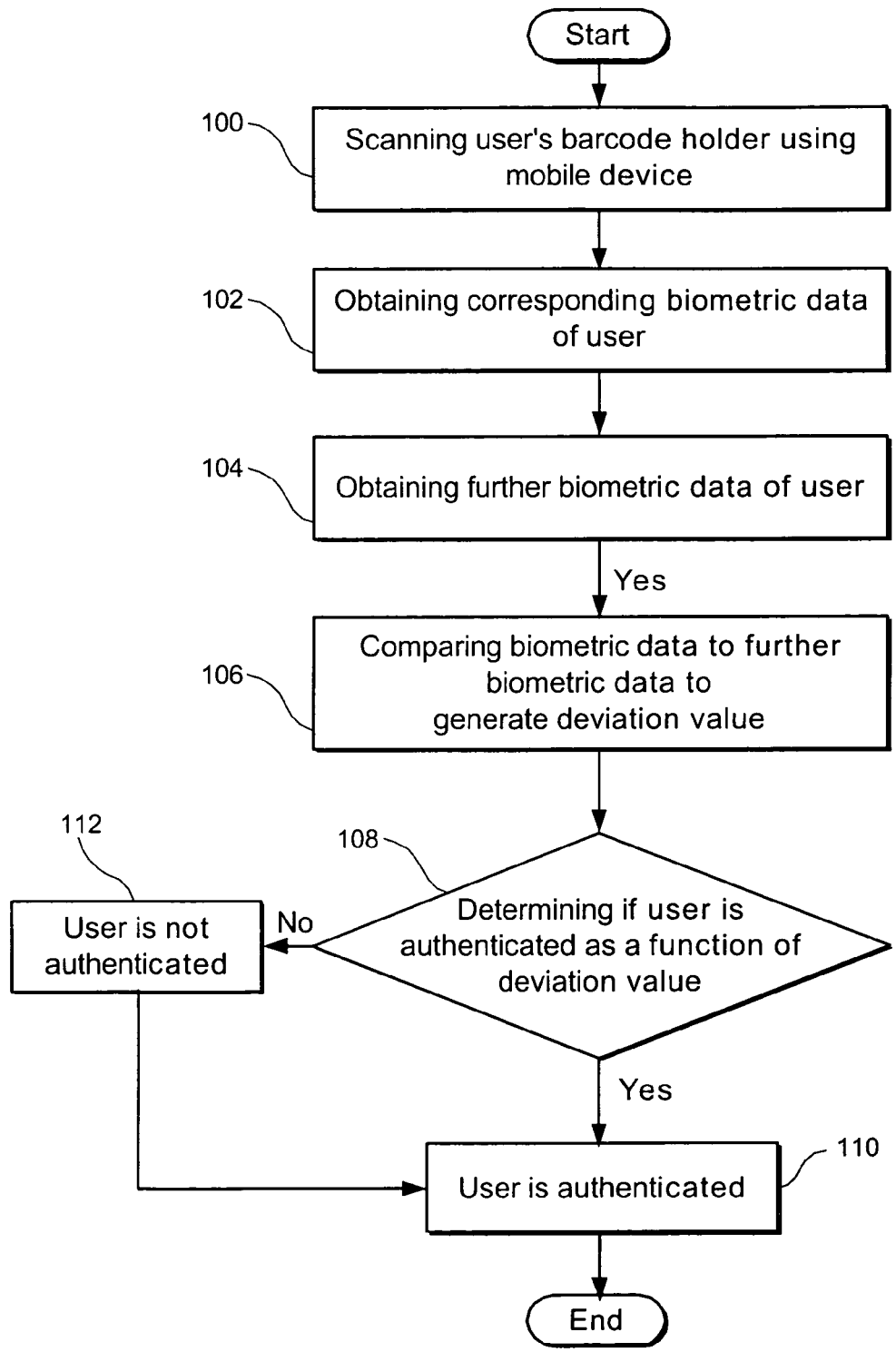
FIG. 5 shows an exemplary embodiment of a method according to the present invention.

FIG. 5 shows an exemplary embodiment of a method according to the present invention which will be explained below with reference to the system 1a of FIG. 2. In step 100, the mobile device 10 scans bar code data 15a to obtain identification data corresponding to the authorized person of the identification including the bar code data 15a. Once the identification data has been obtained, the mobile device 10 contacts the server 40 via the communications network 50 to obtain a record for the authorized person. As described above, the record stored in the database 42 may include prestored biometric data as well as other identification for the authorized person (step 102).

In step 104, the biometric data of the person presenting the identification is obtained using the same mobile unit 10. In particular, the mobile unit 10 is aimed at a specific facial feature corresponding to the stored biometric data recognition data 20 and this feature of the person presenting the identification is imaged. For example, where the record for the authorized person includes biometric data on the iris, the mobile device 10 is aimed at the iris of the person presenting the identification and the iris is imaged using near infrared illumination. A selected portion of this image 25 corresponding to the biometric data stored in the record is then lifted from the entire image 30 or from a plurality of images 30.

As mentioned above, the mobile device 10 may include a dual-illumination system which allows operation of the mobile device 10 in a first mode to obtain the iris data 25 using illumination from outside the visible spectrum (e.g., near infrared) and in a second mode using visible light for reading the bar code data 15. More specifically, in the first mode when obtaining iris data 25, the mobile device may use a broadband near infrared spectrum (e.g., between 740 nm and 880 nm) to illuminate the iris of the person.

One of the advantages of using the near infrared spectrum over the visible light for obtaining the iris data 25 is that the near infrared spectrum does not cause the pupil of the person being imaged to contract. Such contraction can degrade the quality of an iris scan. In addition, visible light directly aimed a person's iris is irritating. Near infrared spectrum light aimed in this manner is not unpleasant to the person being imaged. On the other hand, using visible light is preferred for reading the bar code 15 as the visible light produces a higher quality image of the data, while the near infrared light may not be able to read some inks that are used to generate bar code data 15. Of course, if desired a single near infrared illumination source could be used for both iris and bar code imaging.

FIG. 4 shows a mobile device 10 scanning an iris 28. The mobile device 10 may be situated a particular distance d from the iris 28. A separation S may be determined as a function of the distance d and a field of view (FoV) α which preferably should be approximately 12 degrees of offset (i.e., for a total of 24 degrees). When the mobile device 10 takes an image, this image includes relevant and irrelevant data. In particular, the relevant data may be at least a portion of the iris and the irrelevant data may be a region surrounding the iris. An image processing unit of the mobile device 10 would process the image and separate the relevant and irrelevant data.

Table A, illustrated below, lists several options to obtain various resolutions using the mobile device 10.

TABLE A

| | | Horizontal Pixels | 640 | 800 | 1024 | 1280 |
|---|---|---|---|---|---|---|
| Iris Scanning Barcode Scanning | Max Rd Distance | | 3.5" | 4" | 4.5" | 5" |
| | FoV | | 22.4 | 24.4 | 27.7 | 31 |
| | Minimum 3.5" Obj Rd Distance" | | 8.8" | 8.1" | "7.1 | 6.3" |
| | Pixel Density (Pixels/Inch) | | 183 | 229 | 293 | 366 |
| | | Vertical Pixels | 480 | 600 | 768 | 1024 |
| Facial Recognition | Minimum read distance (7" vertical) | | 24" | 22" | 19" | 16" |
| | max read distance (@ 20 dpi) | | 60" | 92" | 104" | 115" |

For example, the mobile deice 10 may include a VGA resolution sensor which may include a short range focus (e.g., 3.5") and an FoV α of 22.4 degrees and a long range focus. This setup provides adequate pixel density across the small target. The long range focus may, e.g., be from 8.8" out to infinity. Keeping the same FoV α simplifies the dual focus selection and allows a 3.5" wide bar code 15 to be read using the 8.8" focus. The facial recognition data 20, which generally requires approximately 20 pixels per inch across 7 inches, may be obtained at a distance d ranging between 24" and 60" using the far focus.

Once the image data corresponding to the stored biometric data has been obtained using the mobile device 10, the image data is compared to the biometric data obtained form the database 42 to generate a deviation value (step 106). The deviation value is indicative of similarity of the biometric data and the image data. It is important to allow for a certain degree of deviation between these data sets as scans of the same biometric feature may result in slightly deviated data.

The deviation value is then compared to a predetermined deviation value (step 108). For example, the system 1a may be set to authenticate the person only if the deviation data is less 2 on a scale between 1 and 10 where 1 indicates the biometric and the further biometric data is identical. If the predetermined deviation value is greater than the predetermined deviation value, the person is not authenticated (step 112). Otherwise, the person is authenticated (step 110).

The method for the system 1b shown in FIG. 3 is substantially similar to the method described above with the exception of step 102. The system 1b utilizes the two-dimensional bar code data 15b which can store biometric data of the person on the identification itself. This stored data can then be compared with data from an image of the person presenting the identification with no need to access the server 40 and the database 42. In step 102, the biometric data is extracted from the two-dimensional bar code 15b and is stored in the database 45 for comparing it with the further biometric data. The bar code 15b may, for example, be secured using a digital signature (e.g., a public/private key structure) and/or a conventional encryption system.

Finally, it may happen that individuals requiring eyeglasses may be unable to focus on the aiming mechanism when their glasses have been removed. To allow for this, a display showing the area within the field of view of the imager 12 may be included in the mobile device 10. This display may, for example, be an LCD screen or other know display. Furthermore, as would be understood by those skilled in the art, the device may include a distance sensor with audio or visual cues indicating when the subject is too close, too far, or properly positioned for the imaging process.

There are many modifications to the present invention which will be apparent to those skilled in the art without departing form the teaching of the present invention. The embodiments disclosed herein are for illustrative purposes only and are not intended to describe the bounds of the present invention which is to be limited only by the scope of the claims appended hereto.

What is claimed is:

1. A portable device for authenticating an identity of a person, comprising:
an imager;
an image processing unit reading encoded data in a first image from the imager, the image processing unit extracting a portion of a second image from the imager to generate extracted portion data, wherein the extracted portion of the second image corresponds to a portion of a person whose identity is to be authenticated; and a processor for comparing the extracted portion data of the second image to stored biometric data for the person, wherein the stored biometric data is stored in a remote database and is located as a function of an identifier derived from the data read from the first image, wherein the identifier is transmitted from the portable device to the remote database, wherein the imager is a dual-illumination imager using a visual spectrum and a non-visible spectrum, wherein the imager includes a first light source for providing light in the visual spectrum, wherein the imager includes a second light source for providing light in the non-visible spectrum, and wherein the imager activates only the second light source in order to generate the second image.

2. The portable device according to claim 1, wherein the extracted portion data of the second image includes at least one of a facial recognition data and an image data of the person.

3. The portable device according to claim 2, wherein the imager utilizes a visible spectrum to obtain the first and second images, the image processing unit generating at least one of the facial recognition data and the image data using the extracted portion of the second image.

4. The portable device according to claim 1, wherein the extracted portion data includes an iris of the person.

5. The portable device according to claim 4, wherein the imager utilizes a non-visible spectrum to obtain the second image, the image processing unit generating the iris data as a function of the extracted portion of the second image.

6. The portable device according to claim 1, wherein the first image is a bar code containing the identifier.

7. The portable device according to claim 1, wherein the imager is a dual focus imager.

8. The portable device according to claim 7, wherein a first focus of the imager is used to obtain the first image and a second focus of the imager is used to obtain the second image, and wherein a field of view is the same for the first and second focuses.

9. The portable device according to claim 8, wherein the field of view is varied to correspond to a desired resolution of the first and second images.

10. A method for authenticating an identity of a person using a portable device, comprising the step of:
  reading encoded data in a first image from an imager of the device using an image processing unit of the device;
  extracting a portion of a second image from the imager using the image processing unit to generate extracted portion data, wherein the extracted portion of the second image corresponds to a portion of a person whose identity is to be authenticate;
  locating stored biometric data for a person as a function of an identifier derived from the data read from the first image, wherein the stored biometric data is stored in a remote database and the identifier is transmitted from the portable device to the database; and
  comparing the extracted portion data of the second image to the stored biometric data for a person using a processor of the device, wherein the imager is a dual-illumination imager using a visual spectrum and a non-visible spectrum. wherein the imager includes a first light source for providing light in the visual spectrum, wherein the imager includes a second light source for providing light in the non-visible spectrum. and wherein the imager activates only the second light source in order to generate the second image.

11. The method according to claim 10, wherein the extracted portion data includes iris data of the person.

12. The method according to claim 11, further comprising the steps of:
  obtaining the second image using the imager which utilizes a non-visible spectrum;
  with the image processing unit, generating the iris data as a function of the extracted portion of the second image; and
  comparing the iris data to the stored biometric data.

13. The method according to claim 10, wherein the first image is a bar code containing the identifier.

14. The method according to claim 10, wherein the imager is a dual focus imager.

15. The method according to claim 14, wherein a first focus of the imager is used to obtain the first image and a second focus of the imager is used to obtain the second image, and wherein a field of view is the same for the first and second focuses.

16. The portable device according to claim 15, wherein the field of view is varied to correspond to a desired resolution of the first and second images.

17. A system for authenticating an identity of a person, comprising:
  a first image; and
  a portable device including an imager, an image processing unit and a processor, the image processing unit reading encoded data in the first image from the imager, the image processing unit extracting a portion of a second image from the imager to generate extracted portion data,
  wherein the extracted portion of the second image corresponds to a portion of a person whose identity is to be authenticated, the processor comparing the extracted portion of the second image to stored biometric data for a person, wherein the stored biometric data is stored in a remote database and is located as a function of an identifier derived from the data read from the first image, and wherein the identifier is transmitted from the portable device to the remote database wherein the imager is a dual-illumination imager using a visual spectrum and a non-visible spectrum, wherein the imager includes a first light source for providing light in the visual spectrum, wherein the imaszer includes a second light source for providing light in the non-visible spectrum, and wherein the imager activates only the second light source in order to generate the second image.

18. The system according to claim 17, wherein the extracted portion is an iris of the person, the imager utilizing a non-visible spectrum to obtain the iris, the image processing unit generating the iris data as a function of the iris, the processor comparing the iris data to the stored biometric data to determine if the person is authenticated.

19. The system according to claim 17, further comprising:
  a remote server that includes the remote database,
  wherein the first image is a bar code containing the identifier.

20. The system according to claim 17, wherein the imager is a dual focus imager.

21. The system according to claim 20, wherein a first focus of the imager is used to obtain the first image and a second focus of the imager is used to obtain the second image, and wherein a field of view is the same for the first and second focuses.

22. The portable device according to claim 21, wherein the field of view is varied to correspond to a desired resolution of the first and second images.

* * * * *

UNITED STATES PATENT AND TRADEMARK OFFICE
CERTIFICATE OF CORRECTION

PATENT NO. : 7,512,254 B2  Page 1 of 1
APPLICATION NO. : 10/291955
DATED : March 31, 2009
INVENTOR(S) : Vollkommer et al.

It is certified that error appears in the above-identified patent and that said Letters Patent is hereby corrected as shown below:

ON THE FACE PAGE

On the Title Page Item (57), under "ABSTRACT", Line 3, delete "includes" and insert -- include --, therefor.

In Column 1, Line 32, delete "includes" and insert -- include --, therefor.

In Column 4, Line 46, delete "know" and insert -- known --, therefor.

In Column 5, Line 50, in Claim 10, delete "authenticate;" and insert -- authenticated; --, therefor.

In Column 5, Line 60, in Claim 10, delete "spectrum." and insert -- spectrum, --, therefor.

In Column 5, Line 63, in Claim 10, delete "spectrum." and insert -- spectrum, --, therefor.

In Column 5, Line 67, in Claim 11, delete "iris" and insert -- an iris --, therefor.

In Column 6, Line 42, in Claim 17, delete "imaszer" and insert -- imager --, therefor.

Signed and Sealed this

Ninth Day of February, 2010

David J. Kappos
*Director of the United States Patent and Trademark Office*